United States Patent
Hagen

(10) Patent No.: US 7,536,235 B2
(45) Date of Patent: May 19, 2009

(54) MULTIHEAD COMPOSITE MATERIAL APPLICATION MACHINE POST-PROCESSOR METHOD AND APPARATUS FOR MANUFACTURING COMPOSITE STRUCTURES

(75) Inventor: Allen B. Hagen, Auburn, WA (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 11/313,622

(22) Filed: Dec. 22, 2005

(65) Prior Publication Data

US 2007/0150080 A1   Jun. 28, 2007

(51) Int. Cl.
*G06F 19/00* (2006.01)
(52) U.S. Cl. .............. 700/119; 700/61; 700/98
(58) Field of Classification Search .......... 700/56, 700/119, 61, 63, 86, 184, 190
See application file for complete search history.

(56) References Cited

U.S. PATENT DOCUMENTS

| | | | |
|---|---|---|---|
| 4,867,834 A | | 9/1989 | Alenskis et al. |
| 5,837,960 A | * | 11/1998 | Lewis et al. ............ 219/121.63 |
| 7,003,373 B2 | * | 2/2006 | Baumann et al. ............ 700/189 |
| 2005/0039843 A1 | * | 2/2005 | Johnson et al. ............ 156/175 |
| 2005/0240291 A1 | * | 10/2005 | Oldani et al. ................ 700/57 |
| 2005/0247396 A1 | * | 11/2005 | Oldani et al. ............... 156/173 |
| 2005/0288813 A1 | * | 12/2005 | Yang et al. .................. 700/119 |

OTHER PUBLICATIONS

U.S. Appl. No. 11/269,905, Hagen et al., "Multihead Composite Material Application Machine Programming Method and Apparatus For Manufacturing Composite Structures," filed Nov. 9, 2005.

* cited by examiner

*Primary Examiner*—Kidest Bahta
*Assistant Examiner*—Nathan Laughlin

(57) ABSTRACT

A composite part program post-processor that produces a composite part program for use with a computer-numerical control (CNC) multihead composite material application machine. The post-processor includes a definition receiver, a route delineator, an approach and departure profiler, a machine axis solution computer, and an output file composer. The definition receiver receives material application path definitions, for example, from a composite part program generator. The route delineator delineates tool carriage and manufacturing tool routes. In addition, the approach and departure profiler adds approach and departure profiles to the paths, and the machine axis position computer computes machine axis positions to control the composite material application machine and guide the composite material application heads along the paths. The output file composer then composes a CNC composite part program.

35 Claims, 3 Drawing Sheets

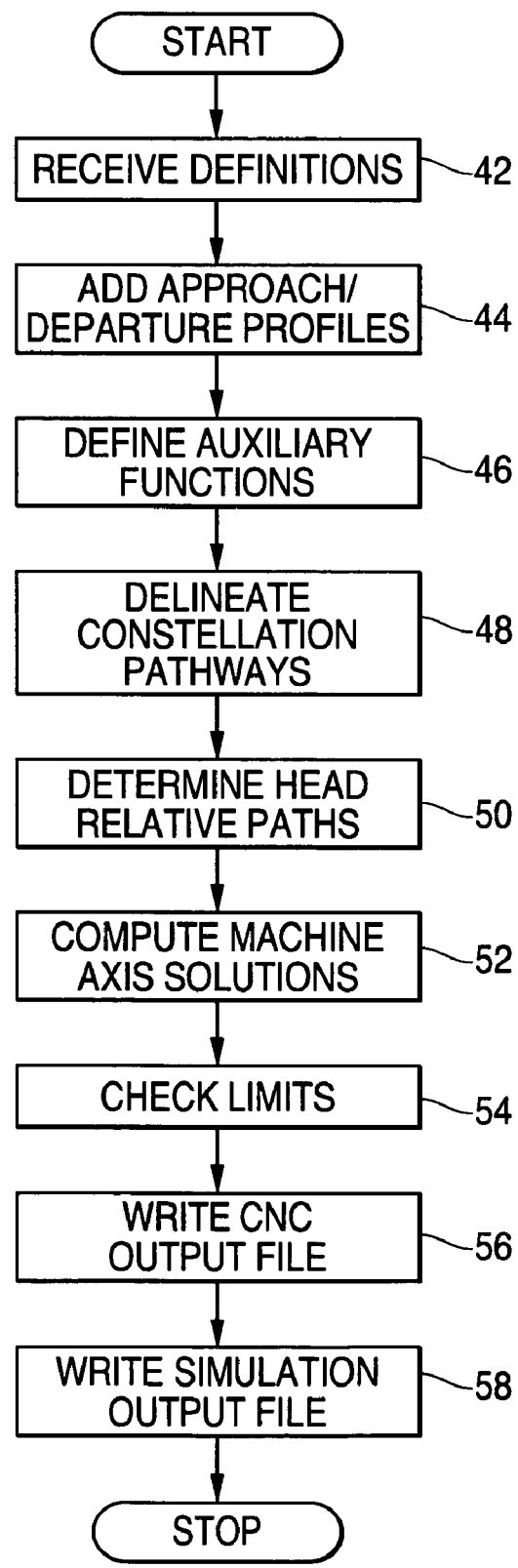

MULTIHEAD COMPOSITE MATERIAL APPLICATION MACHINE POST-PROCESSOR METHOD AND APPARATUS FOR MANUFACTURING COMPOSITE STRUCTURES

FIELD OF THE INVENTION

The present invention relates generally to composite part manufacturing. More particularly, the present invention relates to producing part programs for multihead, computer-numerical-controlled, composite tape lamination and fiber placement machines.

BACKGROUND OF THE INVENTION

Composite materials have been used increasingly in a variety of industries, including the automotive, marine and aerospace industries. In some instances, composite parts can be formed using automated composite material application machines, such as composite tape lamination machines or composite fiber placement machines.

Some existing composite material application machines, for example, a flat tape lamination machine (FTLM) or a contoured tape lamination machine (CTLM), can be capable of producing flat or gently contoured composite parts by laying relatively wide strips of composite tape onto generally horizontal or vertical tooling surfaces, such as a mandrel. Other existing composite material application machines, for example, an automated fiber placement (AFP) machine, can be capable of producing generally cylindrical or tubular composite parts by wrapping relatively narrow strips of composite tape, or tows, around a rotating manufacturing tool, such as a mandrel.

Generally, existing automated composite material application machines have a single composite material application head. Correspondingly, existing composite material application machine programming systems generally are capable of producing a numerical control (NC) or computer numerical control (CNC) program designed to control a single composite material application machine having a single composite material application head.

In order to more efficiently produce relatively large composite parts, including aircraft fuselage sections, a high-rate, multihead, composite material application machine has been conceived. As conceived, the multihead composite material application machine should be capable of manufacturing a wide variety of composite parts, such as flat spars, stringer charges, wing skins and fuselage barrel sections, as well as composite parts in other industries, such as the automotive, marine, industrial vehicle and prefabricated architectural structure industries.

However, existing composite part programming systems do not have the capacity to efficiently program a composite material application machine with multiple composite material application heads to form a variety of composite parts. Accordingly, it is desirable to provide a method and apparatus that can efficiently produce a composite part program for a high-rate composite material application machine with multiple composite material application heads to form a variety of composite parts without requiring excessive manual programming.

SUMMARY OF THE INVENTION

The foregoing needs are met, to a great extent, by the present invention, wherein in one aspect an apparatus is provided that in some embodiments can efficiently produce a composite part program for a high-rate composite material application machine with multiple composite material application heads to form a variety of composite parts.

In accordance with one aspect of the present invention, a computer-implemented method of producing a program to operate a multihead composite material application machine can include receiving a first path definition assigned to a first composite material application head on the multihead composite material application machine and computing a plurality of first machine axis position solutions based at least in part on the first path definition to control the first composite material application head. The method can also include writing a computer numerical control output data file based at least in part on the machine axis position solutions.

In accordance with another aspect of the present invention, a computer program product for programming a multihead composite material application machine, including a computer-readable medium encoded with instructions configured to be executed by a processor in order to perform predetermined operations that can include receiving a first path definition assigned to a first composite material application head on the multihead composite material application machine and computing a plurality of first machine axis position solutions based at least in part on the first path definition to control the first composite material application head. the predetermined operations can also include writing a computer numerical control output data file based at least in part on the machine axis position solutions.

In accordance with yet another aspect of the present invention, a composite part program post-processor to produce a program to operate a multihead composite material application machine can include a definition receiver configured to receive a first path definition assigned to a first composite material application head on the multihead composite material application machine and a machine axis solution computer configured to compute a plurality of first machine axis position solutions based at least in part on the first path definition to control the first composite material application head. The post-processor can also include an output file composer configured to write a computer numerical control output data file based at least in part on the machine axis position solutions.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the

BRIEF DESCRIPTION OF THE DRAWINGS

FIG. 3 is a flowchart illustrating steps that may be followed to produce a composite part program in accordance with one embodiment of the method or process.

DETAILED DESCRIPTION

Figure 1:
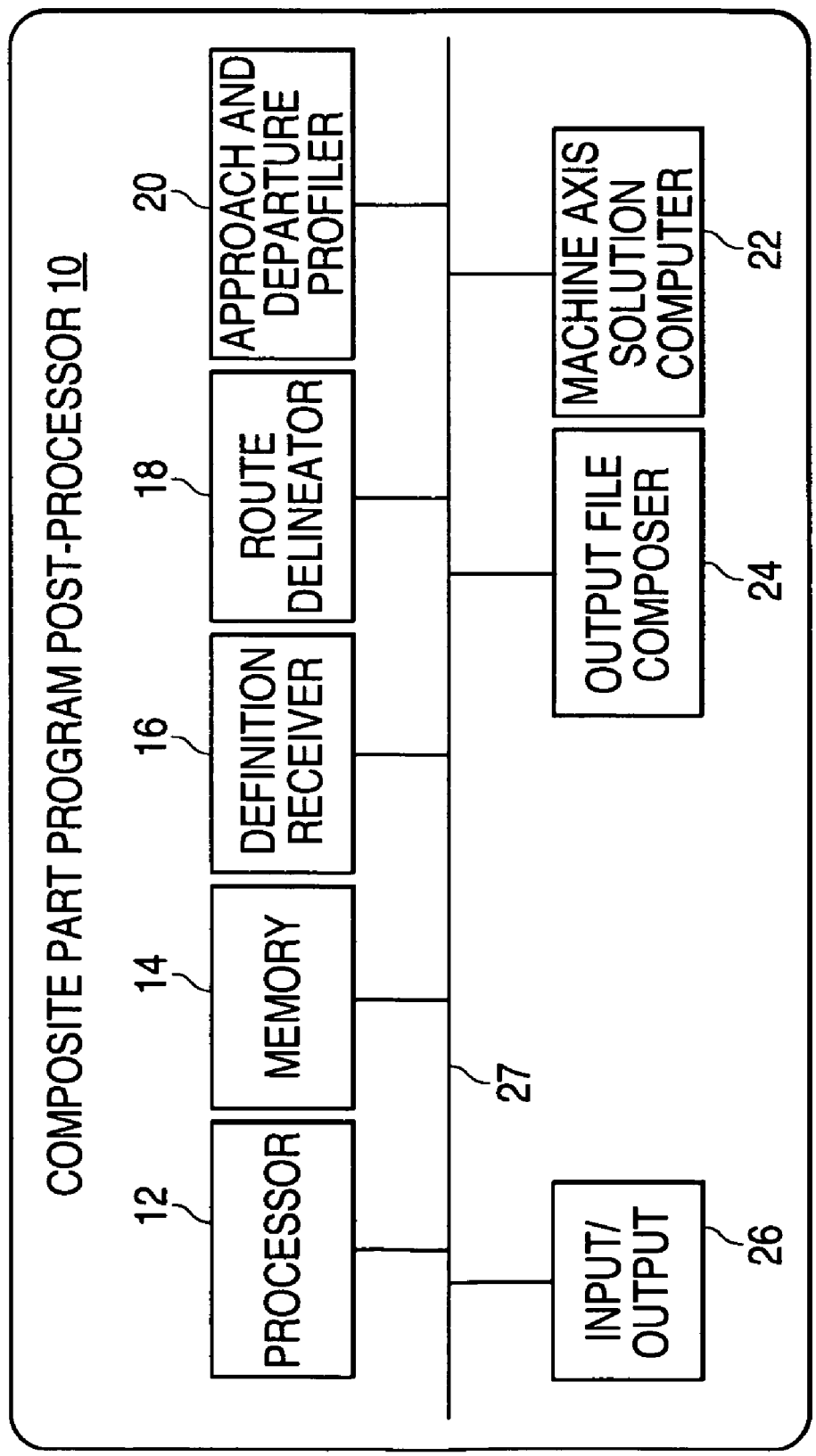
FIG. 1 is a block diagram illustrating a composite part program post-processor of a type suitable for carrying out the functions of an embodiment of the invention.

An embodiment in accordance with the present invention provides a composite part program post-processor that can be used, for example, in combination with or as a component of a composite part program generator, such as the composite part program generator disclosed in U.S. patent application Ser. No. 11/269,905, entitled "Multihead Composite Material Application Machine Programming Method and Apparatus for Manufacturing Composite Structures," filed by Hagen et al. on Nov. 9, 2005, the disclosure of which is hereby incorporated by reference in its entirety.

The composite part program post-processor is capable of producing composite part programs for a wide variety of large, complex composite parts, including relatively flat, contoured, or generally cylindrical composite parts. This programming method can reduce the labor required to produce a composite part program for a multihead composite material application machine by an order of magnitude with respect to manual or existing automated programming methods.

The composite part program post-processor can produce, for example, composite part programs for use with computer-numerical control (CNC) composite material application machines having a single composite material application head, such as existing composite tape-laying machines and automated fiber placement machines. In addition, the composite part program post-processor can produce composite part programs for use with CNC multihead composite material application machines, as well as multi-machine composite manufacturing equipment.

The composite part program post-processor can include a definition receiver, a route delineator, an approach and departure profiler, a machine axis solution computer, and an output file composer. The definition receiver can receive composite material application path definitions, for example, from a composite part program generator. In addition, the route delineator can delineate tool carriage and manufacturing tool routes for the multihead composite material application machine. Furthermore, the approach and departure profiler can add approach and departure profiles to the paths, and the machine axis position computer can compute machine axis positions to control the composite material application machine and guide the composite material application heads along the paths. The output file composer can then compose a CNC composite part program.

The composite part post-processor can produce composite part programs to control a higher number of machine axes than that permitted by the maximum interpolation group size of some existing CNC controllers. For example, some existing composite programming methods are limited to one composite material application head, whereas the method herein disclosed has been demonstrated on four-head and eight-head configurations having up to 50 machine axes on a common, moveable tool carriage and a corresponding rotating manufacturing tool. Furthermore, this method can be scaled for use with machines having at least sixteen delivery heads or systems having at least sixteen single-head machines.

The invention will now be described with reference to the drawing figures, in which like reference numerals refer to like parts throughout. An embodiment in accordance with the present invention provides a composite part program post-processor for producing a composite part program that can control a single-head or multihead composite material application machine. FIG. 1 illustrates an embodiment of a representative embodiment of a composite part program post-processor 10, including a processor 12, a memory 14, a definition receiver 16, a route delineator 18, an approach and departure profiler 20, a machine axis solution computer 22, an output file composer 24 and an input/output (I/O) device 26, all of which are interconnected by a data link 27.

The processor 12, the memory 14 and the input/output device 26 can be part of a general computer, such as a personal computer (PC), a UNIX workstation, a server, a mainframe computer, a personal digital assistant (PDA), or some combination of these. The remaining components can include programming code, such as source code, object code or executable code, stored on a computer-readable medium that can be loaded into the memory 14 and processed by the processor 12 in order to perform the desired functions of the composite part program post-processor 10.

The post-processor 10 can further receive path definitions that the composite material application heads can follow to apply the composite material over the manufacturing tool surface, or over a previous ply surface, in order to form the composite part. The path definitions can be received, for example, from a path generator or course head manager of a composite part program generator that define the paths and assign the paths to individual composite material application heads of a specific type of composite material application machine.

Figure 2:
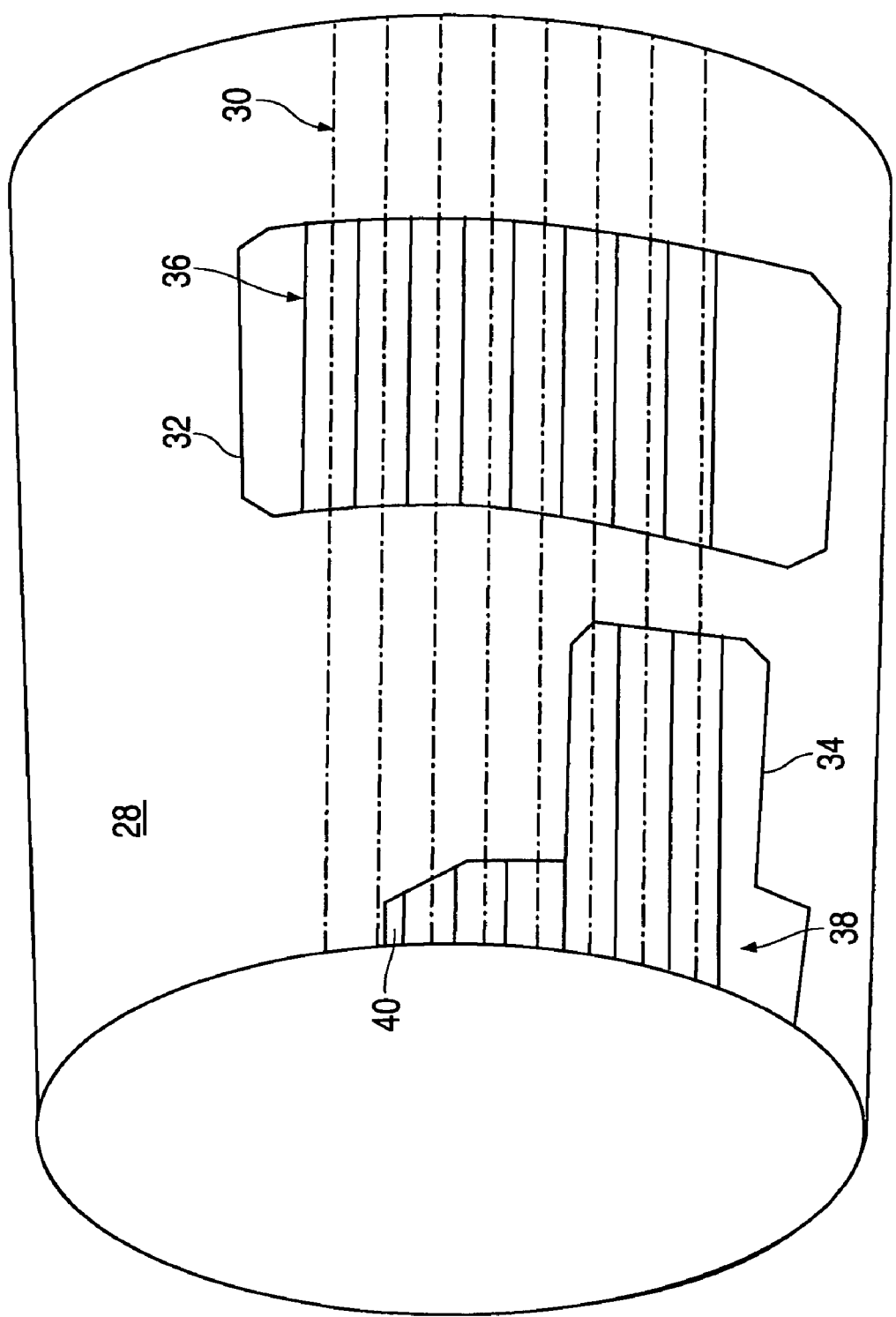
FIG. 2 is a perspective view illustrating a large, generally cylindrical composite part showing designated composite material application paths and tape courses that can be programmed by a preferred embodiment of the invention.

For example, FIG. 2 illustrates a manufacturing tool 28, or mandrel, for a large, generally cylindrical composite part with eight representative composite material application paths 30 designated in a generally horizontal direction across the surface of the manufacturing tool 28. FIG. 2 further illustrates a first ply boundary 32 and a second ply boundary 34. Eight contiguous composite material segments, in this case tape courses 36, which correspond to the composite material application paths 30, are delineated within the first ply boundary 32. Likewise, seven contiguous composite tape courses 38 are delineated within the second ply boundary 34, including a nonstandard tape course 40 having a width that is substantially less than the distance between each of the adjacent pairs of paths 30, or the nominal composite tape width.

As an example, a composite tape-laying machine may have one or more composite material application heads attached to a tool carriage and configured to apply composite tape having a standard or nominal width of three inches, six inches, or any other suitable width. The composite tape-laying machine may further include a composite material application head that applies a strip or multiple strips of composite tape having a nonstandard width. For example, a representative multihead composite tape-laying machine may include one or more standard heads that apply nominal three-inch wide strips of composite tape, as well as one or more specialized heads that apply strips of composite tape of nonstandard width, such as one-eighth inch or one-quarter inch wide strips, or "tows." In addition, a specialized head may have the capacity to apply multiple nonstandard strips up to an aggregate width equal to the nominal tape width, for example, up to twenty-four one-eighth-inch composite tape tows on a machine having a standard nominal tape width of three inches.

Although the composite material application paths 30 and tape courses 36, 38 shown in FIG. 2 are generally horizontal, or parallel to the axis of the manufacturing tool 28 (for reference in this example, the zero-degree fiber orientation), additional plies may have other fiber orientations, such as ninety degrees or forty-five degrees, or any suitable fiber orientation to satisfy the composite part design requirements. In addition, standards are established to set limits on the size of gaps between or overlap of adjacent composite material segments.

In one embodiment of the composite part program post-processor 10, the path definitions can be received in a Cartesian coordinate system, for example, to produce generally flat or contoured parts. In other embodiments, the post-processor 10 can receive the path definitions in any suitable coordinate system, for example, a polar coordinate system, such as an angular reference system, for example, to produce generally cylindrical parts on a rotating manufacturing tool 28, a cylindrical coordinate system, a circular coordinate system, a spherical coordinate system; a curvilinear coordinate system; or the like.

In some embodiments, the post-processor 10 can also receive definitions of the individual composite material segments, such as the individual tape courses 36, 38 in the case of a tape lamination machine. The composite material segment definitions can define tape cut patterns required to form the tape courses. In one embodiment of the post-processor 10, the tape cut patterns can be defined as butt cuts normal to the centerline of the tape courses 36, 38, while in other embodiments the tape cut patterns can be defined as more complex patterns, for example, consisting of a combination of line segments.

In a preferred embodiment of the post-processor 10, the paths can be assigned to individual delivery heads of a specific type of composite material application machine (machine-specific), and to specific tool carriage passes over the manufacturing tool surface. However, in other embodiments, the path definitions can be independent of any composite material application machine (machine-independent).

The path definitions, composite material segment definitions and path-to-head and tool carriage pass assignment data can be used by the post-processor 10 to generate CNC part programs in machine code format that can be executed on a multihead composite material application machine, as well as on a conventional single-head composite material application machine. The post-processor 10 can provide the capability in post-processing for the programmer to manage composite material application head dynamics, such as approaching or departing the manufacturing tool or composite part surface, and starting, stopping and cutting the composite material. The post-processor 10 also allows the programmer to control machine axis accelerations and velocities, so as to improve or optimize an overall composite material application rate.

Initially, the post-processor 10 can receive the path data, including the path definitions as well as the path-to-head and carriage pass assignments. The post-processor 10 can add machine axis motion control data for approach of the composite material application heads to the manufacturing tool or composite part surface at the beginning of each tool carriage pass or composite material segment and departure of the composite material application heads from the surface at the end of each pass or segment. That is, for each composite material application head having a path assigned on a given tool carriage pass, the post-processor 10 can add an approach-to-surface definition, or motion profile, and a departure-from-surface definition, or motion profile. In some embodiments, the post-processor 10 can add a head approach profile and departure profile for each composite material application path 30. In other embodiments, the post-processor 10 can add a head approach profile and departure profile for each composite material segment along each of the paths 30.

Thus, for each composite material application path 30, or for each composite material segment along each path 30, the post-processor 10 can add machine axis motion control data for the composite material feed mechanism. For example, the post-processor 10 can add a profile to start a composite material feed mechanism and accelerate the composite material feed rate to match the velocity of the manufacturing tool or composite part surface relative to the material application head, command the feed mechanism to release the composite material, stop the feed mechanism, and allow the composite material to continue feeding against a nominal tension. This process, referred to as "add on the fly," can be synchronized so that the composite material end is placed in a precise location. For example, on a tape-laying machine, the "add on the fly" process can be synchronized such that the tape end passes under a corresponding head compaction device precisely at the location specified by the composite material segment definition, that is, in compliance with a specified composite material end placement tolerance.

Similarly, for each composite material application path 30, or for each composite material segment along each path 30, the post-processor 10 can add machine axis motion control data for accelerating the corresponding head in advance, then decelerating the head momentarily to match the velocity of the manufacturing tool surface, stopping the composite material feed mechanism, cutting a composite material end, and accelerating the head to reposition the head in a nominal position relative to the tool carriage or "constellation" of composite material application heads. This process, referred to as "cut on the fly," can also be synchronized so that the composite material end is placed in a precise location. For example, on a tape-laying machine, the "cut on the fly" process can be synchronized such that the tape end passes under the corresponding head compaction device precisely at the location specified by the composite material segment definition, that is, in compliance with a specified composite material end placement tolerance. Furthermore, the "cut on the fly" process can include decelerating the head to momentarily maintain a fixed position with regard to the manufacturing tool or composite part surface to allow time for the composite material to be cut in place.

The "add on the fly" and "cut on the fly" motion profiles, as well as the approach-to-surface and departure-from-surface motion profiles, can be defined in a manner that allows the tool carriage and the manufacturing tool to travel at a constant velocity or to follow a constellation motion profile that is independent of the approach, departure, add and cut locations. In addition, the "add on the fly" and "cut on the fly" motion profiles, as well as the approach-to-surface and departure-from-surface motion profiles, can be dynamic—that is, the motion profiles can vary depending on the length of the individual composite material segments and the respective distances between the composite material segments.

Therefore, the post-processor 10 can further verify that the composite material application head approach and departure motion profiles, as well as the "add on the fly" and "cut on the fly" motion profiles, at all points define a continuous and smooth head motion, with regard to the absolute position of the corresponding composite material application head as well as the relative position of the head with respect to the tool carriage position. In addition, the post-processor 10 can verify that the approach, departure, "add on the fly" and "cut on the fly" motion profiles do not violate any requirements or specifications regarding the composite material application machine dynamics.

In some embodiments, the post-processor 10 can include in the approach-to-surface definition a specified location where a composite material applicator compaction device is to be activated, or "compaction on" location. Likewise, the post-processor 10 can include in the departure-from-surface definition a specified location where the composite material applicator compaction device is to be deactivated, or "compaction off" location. In other embodiments, the post-processor 10 can specify a "compaction on" location and a "compaction off" location for each composite material segment along each of the paths 30, for example, in the case of a composite tape-laying machine, for each tape course along each path 30.

In addition, the post-processor can define multiple constellation configurations for the tool carriage passes. For example, with regard to machines with all standard heads, the heads can be arranged in a generally fixed constellation configuration on the tool carriage, which can be moved over the surface. Distinct constellation designs are required for each combination of ply orientation and tool-carriage direction of travel along the paths 30. In addition, each head can be allowed to move relative to the constellation within a limited range to track the precise 3-D geometry of the corresponding path 30 over the surface. Furthermore, limitations or tolerances on movement of the individual composite material application heads within the constellation can prevent collisions between the composite material application heads, or between the composite material application heads and other machine structure.

Furthermore, the post-processor 10 can define a constellation pathway, or a sequence of constellation pathways. That is, the post-processor 10 can evaluate a group of material application paths 30 assigned to a single tool carriage pass and determine a median pathway relative to the group of paths 30. For example, the post-processor 10 can determine an ideal constellation pathway with regard to each composite material application head that has an assigned path for the tool carriage pass, and based on the set of ideal paths determine a median constellation pathway. The post-processor can further verify that each of the heads is able to reach all points of the corresponding path locations based on the constellation pathway.

Additionally, the post-processor 10 can extend the median pathway and define constellation start and end points for the pass—that is, the post-processor 10 can specify a location at which the composite material application heads can be set or positioned in a specific constellation configuration, and a location at which the composite material application heads can be reset or repositioned in a different constellation configuration. The post-processor 10 can further connect the sequential constellation pathways into a continuous chain of directional pathways, or a single continuous pathway.

Based on the constellation pathway, the post-processor 10 can define a tool carriage route and a manufacturing tool, or mandrel, route. For example, the post-processor 10 can determine a sequence of directional passes of the tool carriage across the surface of the manufacturing tool or composite part, and a sequence of rotational or angular movements for a rotating mandrel or translational movements for a flat or contoured mandrel. Since the movement of the composite material application heads over the manufacturing tool or composite part surface depend on the relational position of the tool carriage with respect to the manufacturing tool, some movements of the composite material application heads over the manufacturing tool or composite part surface can be determined by changes in the tool carriage position, the manufacturing tool position, or both. Thus, the manufacturing tool route and the tool carriage route can be interdependent.

Accordingly, the post-processor 10 can synchronize the manufacturing tool route with the tool carriage route to determine an efficient or optimal combination of manufacturing tool and tool carriage movements to obtain the required relational positions based on the constellation pathway. That is, the post-processor 10 can implement classic machine kinematics logic to simultaneously generate machine axis solutions for the tool carriage and for the manufacturing tool in order to effect the constellation pathway.

Moreover, based on the paths 30 and the corresponding constellation pathway, the post-processor 10 can define a relative path for each composite material application head that has an assigned path. The relative paths relate the individual paths 30 to the constellation pathway. Accordingly, the post-processor can determine machine axis solutions to control the individual head movements with respect to the tool carriage based on the relative paths. For example, the post-processor 10 can implement classic machine kinematics logic to generate machine axis position solutions based on the constellation pathway points, the individual path points and the manufacturing tool surface or updated surface normal data. The machine axis solutions can be used to control the composite material application machine movements by way of servo motors, or any suitable actuator for producing composite material application head, tool carriage or manufacturing tool motion.

However, existing CNC controllers do not have the capacity to interpolate a relatively large number of axes in a single interpolation group. Thus, in order to overcome existing CNC controller limitations on axis count, the post-processor 10, rather than the CNC controller, can calculate individual machine axis position, velocity, acceleration, and jerk or surge at all points. The post-processor 10 can further verify that the machine axis solutions do not violate the limitations or specifications of the machine and make minor adjustments to the machine axis solutions to produce smooth physical transitions, while maintaining accurate composite material application paths. Thus, the post-processor can closely synchronize the composite material application head machine axis solutions. In addition, the post-processor 10 can closely synchronize the individual head machine axis solutions with the tool carriage and manufacturing tool machine axis solutions in order to maintain accurate composite material application head control.

In a preferred embodiment of the post-processor 10, a master-slave axis relationship across multiple distributed CNC controllers can be accommodated to manage the relatively large number of coordinated machine axes. For example, the multihead composite material application machine can be controlled by a master CNC controller and multiple slave CNC controllers. The master controller and the slave controllers can be networked together over a high-speed bus that can facilitate the exchange of relevant data between the various controllers during each interpolation cycle. Thus, the master controller can coordinate the individual CNC interpolation cycles.

Furthermore, in order to increase the overall composite material application rate, the post-processor 10 can set a constellation rate, or the rate of motion of a master axis—which can correspond, for example, to the tool carriage motion, to the manufacturing tool motion, or to a combination of the tool carriage motion and the manufacturing tool motion—to one of several predetermined rates that correspond to various composite material application machine operations for each tool carriage pass. For example, in a preferred embodiment, the constellation rate can be adjusted to one of three basic rates, which correspond to composite material "add," "lay down," and "cut" machine operations. Generally, the constellation rate can be constrained by the worst case dynamics of any active composite material application head at any point in time of a tool carriage pass, allowing for acceleration and deceleration time.

In addition, the post-processor 10 can check machine axis limits for all composite material application head, tool carriage and manufacturing tool machine axes to verify that the machine axis limits are not exceeded at any time. Moreover, the post-processor 10 can check all composite material application head positions to ensure that the composite material application head paths of motion are collision-free. In addition, the post-processor 10 can calculate and report the total composite material usage for the composite part program.

Consequently, the post-processor 10 can create an output file, or a set of output files, containing the results of the machine axis solutions in a data format that is compatible with the CNC controller used in conjunction with the specific composite material application machine. For example, in a preferred embodiment of the post-processor 10, the output file can be written in a unique curve table format that is compatible with the Siemens 840D CNC controller family. In some embodiments, an output file or a set of output files can be created for each tool carriage pass defined by the composite part program.

For example, for each tool-carriage pass, the post-processor 10 can produce a curve table file for each machine axis to provide positional data, such as linear interpolation coordinate-point pairs or polynomial function definitions, including the necessary master-slave relationships. Moreover, for each tool carriage pass, the post-processor 10 can produce an additional curve table file for each composite material application head to provide auxiliary code definitions, such as composite material feed control data, cutter control data, and so on. Thus, the post-processor 10 can create multiple, concurrent composite part programs for use with a CNC controller and a composite material application machine, such as a composite tape lamination machine or an automated fiber placement (AFP) machine to manufacture a composite part.

In some embodiments, the output file data format can be compatible with a master-slave CNC control scheme, such as that disclosed herein. For example, in a preferred embodiment, the Siemens 840D curve table format can implement the master-slave axis relationships of the multihead composite material application machine. This is made possible because the curve table can provide a mathematical definition between a leading variable and a slave variable that can be applied to both pairs of machine axes, in addition to conventional CNC control variables applied to each machine axis.

In a preferred embodiment of the invention, the post-processor 10 can create a supplemental output file, or a set of supplemental output files, in a data format that is compatible with a machine simulator that can receive the output file or the supplemental output file and simulate the composite material application machine operations, including multiple composite material application heads with multiple machine axes. For example, the post-processor 10 can produce an output file containing a time-based sampling of the machine axis positional data for use by the machine simulator, which may not be capable of interpreting the composite part program, for example, in the Siemens 840D curve table format.

FIG. 3 is a flowchart illustrating a sequence of steps that can be performed by a composite part program post-processor in order to produce a composite part program. The process can begin by proceeding to step number 42, "Receive Definitions," in which the composite part program post-processor can receive a data file containing the path definitions that the composite material application heads can follow to apply the composite material over the manufacturing tool surface, or over a previous ply surface, in order to form the composite part. In addition, the post-processor can receive data regarding composite material segment definitions and path-to-head and tool carriage pass assignments.

After receiving the input definitions, in step 44, "Add Approach/Departure Profiles," the post-processor can add an approach-to-surface definition, or motion profile, and a departure-from-surface definition, or motion profile for each composite material application path, or for each composite material segment along each of the paths. Then, in step 46, "Define Auxiliary Functions," the post processor can augment the program with auxiliary code definitions, such as composite material feed control data, cutter control data, and so on.

Next, in step 48, "Delineate Constellation Pathways," the post-processor can delineate a constellation pathway. For example, as explained above, the post-processor can define an appropriate constellation configuration of the composite material application heads for a tool carriage pass, and determine an ideal constellation pathway with regard to each composite material application head that has an assigned path for the tool carriage pass. Based on the set of ideal paths, the post-processor can determine a median constellation pathway for each tool carriage pass, and connect the resulting constellation pathways into a continuous chain of directional pathways, or a single continuous pathway. During this step, the post-processor can delineate tool carriage routes and manufacturing tool routes based on the constellation pathways. Then, in step 50, "Determine Head Relative Paths," the post-processor can define a relative path for each composite material application head relating the individual paths to the constellation pathway.

Then control passes to step 52, "Compute Machine Axis Positions," in which the composite part program post-processor can determine machine axis solutions to control the individual head movements with respect to the tool carriage based on the relative paths, to control the tool carriage movements, and to control the manufacturing tool movements. For example, as described above, the post-processor can implement classic machine kinematics logic to generate composite material application head machine axis position solutions based on the constellation pathway points, the individual path points and the manufacturing tool surface or updated surface normal data. Thus, as explained above, the machine axis solutions for the composite material application head, the tool carriage and the manufacturing tool can be closely synchronized.

At this point, in step 54, "Check Limits," the post-processor can verify that the machine axis limits are not exceeded at any time, and check all composite material application head positions to ensure that the head paths of motion are collision-free. During this step, the post-processor can calculate individual machine axis position, velocity, acceleration, and jerk or surge at all points, and make minor adjustments to the machine axis solutions to produce smooth physical transitions, while maintaining accurate composite material application paths.

In step 56, "Write CNC Output File," as explained above, the composite part program post-processor can create a composite part program comprised of a set of output files containing the results of the machine axis solutions in a data format that is compatible with the CNC controller used in conjunction with the specific composite material application machine, for example, in the Siemens 840D curve table format. Finally, in step 58, "Write Simulation Output File," the post-processor can optionally create a set of supplemental output files containing, for example, a time-based sampling of the machine axis positional data in a simulation data format, which can be used by a simulator to model the physical machine, replicate the CNC controller functions, and produce cycle information in order to facilitate machine collision avoidance and process refinement.

FIGS. 1 and 3 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection. In one embodiment of the present invention, the document collection includes documents received over the Internet. Other embodiments are possible, including: a local document collection, i.e., all documents on one computer, documents stored on a server or a client in a network environment, etc.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of producing a program to operate a multihead composite material application machine, comprising:

receiving a plurality of path definitions assigned to a respective plurality of composite material application heads on the multihead composite material application machine, the plurality of path definitions including a first path definition corresponding to a first composite material application head of the plurality of composite material application heads;

determining a median pathway relative to the plurality of path definitions;

defining a constellation configuration based upon the median pathway;

assigning the first composite material application head to a first constellation position in response to determining the constellation configuration;

computing a plurality of first machine axis position solutions based at least in part on the first path definition to control the first composite material application head; and writing a computer numerical control output data file based at least in part on the machine axis position solutions.

2. The computer-implemented method of claim 1, further comprising:

assigning a second composite material application head associated with a tool carriage on the multihead composite material application machine to a second constellation position in response to determining the constellation configuration; and computing a plurality of second machine axis position solutions based at least in part on the second path definition to control the second composite material application head.

3. The computer-implemented method of claim 2, further comprising:

receiving at least a third path definition assigned to a third composite material application head associated with the tool carriage on the multihead composite material application machine; and computing a plurality of third machine axis position solutions based at least in part on the third path definition to control at least the third composite material application head.

4. The computer-implemented method of claim 1, further comprising adding an approach profile based at least in part on the first path definition to guide the first composite material application head to a ply surface.

5. The computer-implemented method of claim 1, further comprising specifying a material feed start profile and a compaction on location based at least in part on the first path definition.

6. The computer-implemented method of claim 1, further comprising specifying a material feed stop profile and a compaction off location based at least in part on the first path definition.

7. The computer-implemented method of claim 1, further comprising adding a departure profile based at least in part on the first path definition to guide the first composite material application head away from a ply surface.

8. The computer-implemented method of claim 1, further comprising:

determining a constellation pathway based on the constellation configuration, the first path definition, and at least one additional path definition, wherein the first machine axis position solutions are further based at least in part on a relation of the first path definition to the constellation pathway.

9. The computer-implemented method of claim 8, further comprising:

delineating a tool carriage route based on the constellation pathway; and delineating a manufacturing tool route based the constellation pathway, wherein the tool carriage route and the manufacturing tool route are interdependent.

10. The computer-implemented method of claim 9, further comprising computing a plurality of carriage machine axis position solutions based at least in part on the tool carriage route to control a tool carriage associated with the first composite material application head and at least a second composite material application head.

11. The computer-implemented method of claim 9, further comprising computing a plurality of tool machine axis position solutions based at least in part on the manufacturing tool route to control a manufacturing tool associated with the multihead composite material application machine.

12. The computer-implemented method of claim 1, further comprising verifying that the machine axis position solutions do not violate a machine limitation.

13. The computer-implemented method of claim 1, further comprising calculating at least one selected from the following: a machine axis velocity, a machine axis acceleration, and a machine axis jerk.

14. The computer-implemented method of claim 1, wherein the output data file includes a plurality of curve tables.

15. The computer-implemented method of claim 1, further comprising writing a supplemental output data file based at least in part on the machine axis position solutions, wherein the output data file is compatible with a simulator.

16. A computer program product for programming a multihead composite material application machine, including a computer-readable medium encoded with instructions configured to be executed by a processor in order to perform predetermined operations comprising:

receiving a plurality of path definitions assigned to a respective plurality of composite material application heads on the multihead composite material application machine, the plurality of path definitions including a first path definition corresponding to a first composite material application head of the plurality of composite material application heads;

determining a median pathway relative to the plurality of path definitions;

defining a constellation configuration based upon the median pathway;

assigning the first composite material application head to a first constellation position in response to determining the constellation configuration;

computing a plurality of first machine axis position solutions based at least in part on the first path definition to control the first composite material application head; and writing a computer numerical control output data file based at least in part on the machine axis position solutions.

17. The computer program product of claim 16, wherein the predetermined operations further comprise:

receiving a second path definition assigned to a second composite material application head associated with a tool carriage on the multihead composite material application machine; and computing a plurality of second machine axis position solutions based at least in part on the second path definition to control the second composite material application head.

18. The computer program product of claim 16, wherein the predetermined operations further comprise:

adding an approach profile based at least in part on the first path definition to guide the first composite material application head to a ply surface; and specifying a material feed start profile and a compaction on location based at least in part on the first path definition.

19. The computer program product of claim 16, wherein the predetermined operations further comprise:

specifying a material feed stop profile and a compaction off location based at least in part on the first path definition; and adding a departure profile based at least in part on the first path definition to guide the first composite material application head away from a ply surface.

20. The computer program product of claim 16, wherein the predetermined operations further comprise:
determining a constellation pathway based on the constellation configuration, the first path definition, and at least one additional path definition, wherein the first machine axis position solutions are further based at least in part on a relation of the first path definition to the constellation pathway.

21. The computer program product of claim 20, wherein the predetermined operations further comprise:
delineating a tool carriage route based on the constellation pathway; and
computing a plurality of carriage machine axis position solutions based at least in part on the tool carriage route to control a tool carriage associated with the first composite material application head and at least a second composite material application head.

22. The computer program product of claim 21, wherein the predetermined operations further comprise:
delineating a manufacturing tool route based the constellation pathway, wherein the tool carriage route and the manufacturing tool route are interdependent; and
computing a plurality of tool machine axis position solutions based at least in part on the manufacturing tool route to control a manufacturing tool associated with the multihead composite material application machine.

23. The computer program product of claim 16, wherein the predetermined operations further comprise:
calculating at least one selected from the following: a machine axis velocity, a machine axis acceleration, and a machine axis jerk; and
verifying that the machine axis position solutions do not violate a machine limitation.

24. The computer program product of claim 16, wherein the output data file includes a plurality of curve tables.

25. The computer program product of claim 16, wherein the predetermined operations further comprise writing a supplemental output data file based at least in part on the machine axis position solutions, wherein the output data file is compatible with a simulator.

26. A composite part program post-processor to produce a program to operate a multihead composite material application machine, comprising:
a definition receiver configured to receive a plurality of path definitions assigned to a respective plurality of composite material application heads on the multihead composite material application machine, the plurality of path definitions including a first path definition corresponding to a first composite material application head of the plurality of composite material application heads;
a route delineator configured to determine a median pathway relative to the plurality of path definitions and define a constellation configuration based upon the median pathway;
a machine axis solution computer configured to compute a plurality of first machine axis position solutions based at least in part on the first path definition to control the first composite material application head; and
an output file composer configured to write a computer numerical control output data file based at least in part on the machine axis position solutions.

27. The composite part program post-processor of claim 26, wherein the definition receiver is further configured to receive a second path definition assigned to a second composite material application head associated with a tool carriage on the multihead composite material application machine, and the machine axis solution computer is further configured to compute a plurality of second machine axis position solutions based at least in part on the second path definition to control the second composite material application head.

28. The composite part program post-processor of claim 27, wherein the definition receiver is further configured to receive a third path definition assigned to a third composite material application head associated with the tool carriage on the multihead composite material application machine, and the machine axis solution computer is further configured to compute a plurality of third machine axis position solutions based at least in part on the third path definition to control the third composite material application head.

29. The composite part program post-processor of claim 26, further comprising an approach and departure profiler configured to add an approach profile based at least in part on the first path definition to guide the first composite material application head to a ply surface, and to specify a material feed start profile and a compaction on location based at least in part on the first path definition.

30. The composite part program post-processor of claim 29, wherein the approach and departure profiler is further configured to specify a material feed stop profile and a compaction off location based at least in part on the first path definition, and to add a departure profile based at least in part on the first path definition to guide the first composite material application head away from a ply surface.

31. The composite part program post-processor of claim 26, wherein the route delineator is further configured to delineate a tool carriage route based the constellation pathway, and to compute a plurality of carriage machine axis position solutions based at least in part on the tool carriage route to control a tool carriage associated with the first composite material application head and at least a second composite material application head.

32. The composite part program post-processor of claim 31, wherein the route delineator is further configured to delineate a manufacturing tool route based the constellation pathway, the tool carriage route and the manufacturing tool route being interdependent, and to compute a plurality of tool machine axis position solutions based at least in part on the manufacturing tool route to control a manufacturing tool associated with the multihead composite material application machine.

33. The composite part program post-processor of claim 26, wherein the machine axis solution computer is further configured to calculate at least one selected from the following: a machine axis velocity, a machine axis acceleration, and a machine axis jerk; and to verify that the machine axis position solutions do not violate a machine limitation.

34. The composite part program post-processor of claim 26, wherein the output data file includes a plurality of curve tables.

35. The composite part program post-processor of claim 26, wherein the output file composer is further configured to write a supplemental output data file based at least in part on the machine axis position solutions, wherein the output data file is compatible with a simulator.

* * * * *